(12) United States Patent
Brees

(10) Patent No.: US 8,083,473 B2
(45) Date of Patent: Dec. 27, 2011

(54) INTERFACE FOR A STAMPED STATOR AND A ONE-WAY CLUTCH

(75) Inventor: William Brees, Wooster, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 670 days.

(21) Appl. No.: 12/290,291

(22) Filed: Oct. 29, 2008

(65) Prior Publication Data

US 2009/0110557 A1    Apr. 30, 2009

Related U.S. Application Data

(60) Provisional application No. 61/001,134, filed on Oct. 31, 2007.

(51) Int. Cl.
   *F04D 29/44*   (2006.01)
   *F16D 41/00*   (2006.01)
(52) U.S. Cl. .......................................... 415/146; 192/46
(58) Field of Classification Search .......... 415/146–147, 415/161, 208.2; 60/342, 441; 192/46, 69.71
See application file for complete search history.

(56) References Cited

U.S. PATENT DOCUMENTS

| 4,377,068 A * | 3/1983 | Braatz .............................. 60/342 |
| 5,822,987 A * | 10/1998 | Tsukamoto et al. ............. 60/441 |
| 7,770,707 B2 * | 8/2010 | Brees et al. ....................... 192/46 |
| 7,850,420 B2 * | 12/2010 | Brees et al. ................... 415/146 |
| 2007/0224042 A1 | 9/2007 | Brees et al. |

\* cited by examiner

*Primary Examiner* — Calvin Lee
(74) *Attorney, Agent, or Firm* — Simpson & Simpson, PLLC

(57) ABSTRACT

A stator, including: a one-way clutch with at least one slot opening radially outward from an outer circumferential portion of an outer race; and a blade assembly including first and second separately formed, stamped blade segments rotationally connected to the one-way clutch via the at least one slot. The blade segments are fixedly connected at respective outer circumferential portions. In one embodiment, the stamped blade segments include respective portions disposed in the at least one slot and disposed radially inward from respective blades for the respective blade segments. In one embodiment, the stator includes at least one rivet disposed in the at least one slot and fixedly secured to first and second portions of the first and second stamped blade segments, respectively, the first and second portions located radially inward from blades for the first and second stamped blade segments, respectively.

19 Claims, 6 Drawing Sheets

INTERFACE FOR A STAMPED STATOR AND A ONE-WAY CLUTCH

CROSS-REFERENCE TO RELATED APPLICATIONS

This application claims the benefit under 35 U.S.C. §119 (e) of U.S. Provisional Application No. 61/001,134 filed on Oct. 31, 2007 which application is incorporated herein by reference.

FIELD OF THE INVENTION

The invention relates to improvements in apparatus for transmitting force between a rotary driving unit (such as the engine of a motor vehicle) and a rotary driven unit (such as the variable-speed transmission in the motor vehicle). In particular, the invention relates to means for connecting a stamped stator and a one-way clutch.

BACKGROUND OF THE INVENTION

The use of a two-part stator blade is disclosed in commonly-owned U.S. patent application Ser. No. 11/728,066, filed Mar. 23, 2007. The use of a two-part stator blade would be enhanced if means were available to interface the blade with a wider variety of one-way clutches.

Thus, there is a long-felt need for a means of interfacing a two-part stator blade with a wider variety of one-way clutches.

BRIEF SUMMARY OF THE INVENTION

The present invention broadly a comprises a blade assembly for a stator, including: a first stamped blade segment arranged to be rotationally connected to an outer race of the stator using at least one radially opening slot on an outer race for the stator; and a second stamped blade segment, separately formed from the first stamped blade segment, having an outer circumferential portion fixedly connected to an outer circumferential portion for the first stamped blade segment. In one embodiment, the second stamped blade segment is arranged to be rotationally connected to the outer race using the at least one radially opening slot.

In one embodiment, the first and second stamped blade segments include at least one first and second portion, respectively, arranged to matingly engage with the at least one radially opening slot and disposed on respective portions of the first and second stamped blade segments disposed radially inward of respective blades in the first and second blade segments. In one embodiment, the blade assembly includes at least one rivet arranged to be disposed in the at least one radially opening slot and fixedly secured to respective portions of the first and second stamped blade segments disposed radially inward of respective blades in the first and second blade segments. In one embodiment, the first and second stamped blade segments include respective pluralities of openings and the at least one rivet includes a plurality of sheet metal rivets having respective portions disposed at respective openings in the respective pluralities of openings.

In one embodiment, the first and second stamped segments include first and second axially extending segments, respectively, arranged to center one or two bearings. In one embodiment, the first axially extending segment includes at least one axially extending tab. In one embodiment, the blade assembly includes a bushing arranged to be radially disposed between an axially extending portion of the first and/or the second stamped blade segment and an inner race for the one-way clutch to radially center the stator.

The present invention also broadly comprises a stator, including: a one-way clutch with at least one slot opening radially outward from an outer circumferential portion of an outer race; and a blade assembly including a first stamped blade segment rotationally connected to the one-way clutch via the at least one slot; and a second stamped blade segment, separately formed from the first stamped blade segment and having an outer circumferential portion fixedly connected to an outer circumferential portion for the first stamped blade assembly. In one embodiment, the second stamped blade segment is rotationally connected to the one-way clutch via the at least one slot.

In one embodiment, the first stamped blade segment includes a portion disposed in the at least one slot and disposed radially inward from blades for the first stamped blade segment and wherein the second stamped blade segment includes a portion disposed in the at least one slot and disposed radially inward from blades for the second stamped blade segment. In one embodiment, the stator includes at least one rivet disposed in the at least one slot and fixedly secured to first and second portions of the first and second stamped blade segments, respectively, the first and second portions located radially inward from blades for the first and second stamped blade segments, respectively.

In one embodiment, the first and second stamped blade segments include respective pluralities of openings and the at least one rivet includes a plurality of sheet metal rivets disposed at respective openings in the respective pluralities of openings. In one embodiment, the stator includes one or two bearings and the first and second stamped segments include first and second axially extending segments, respectively. The one or two bearings are radially centered by the first and second axially extending segments. In one embodiment, the first axially extending segment includes at least one axially extending tab. In one embodiment, the stator includes a bushing radially disposed between an axially extending portion of the first and/or second stamped blade segment and an inner race for the one-way clutch to radially center the stator.

It is a general object of the present invention to provide a means of rotationally connecting a stamped stator blade assembly with a one-way clutch for the stator.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1A:
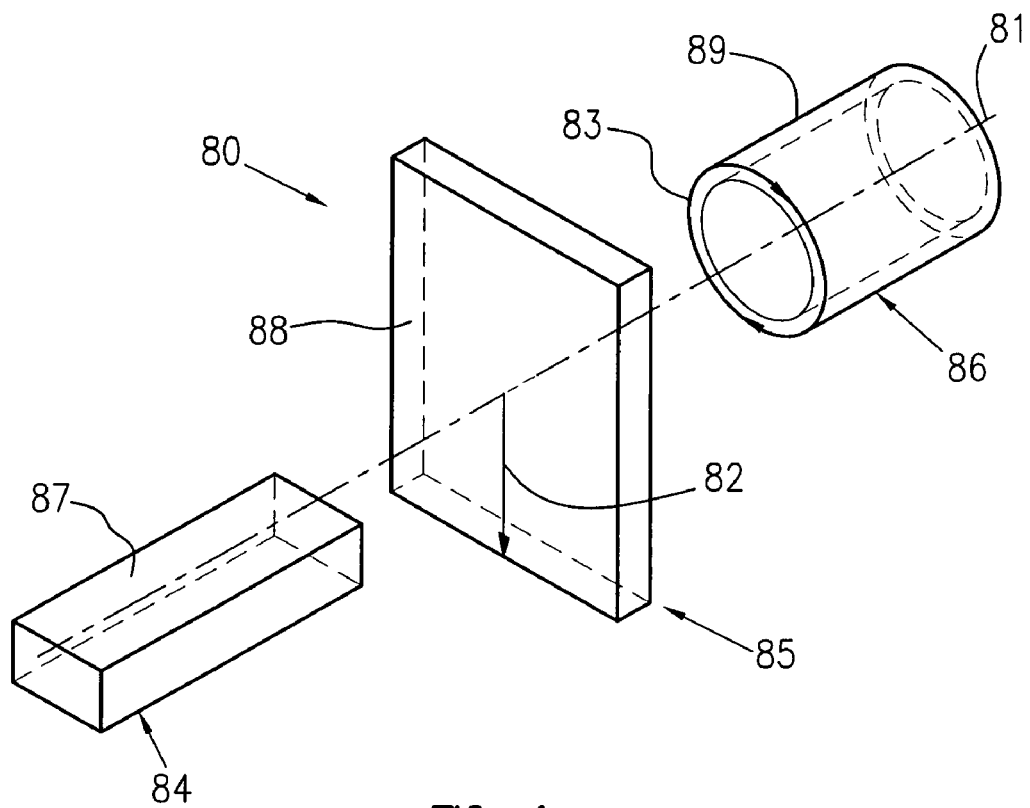
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
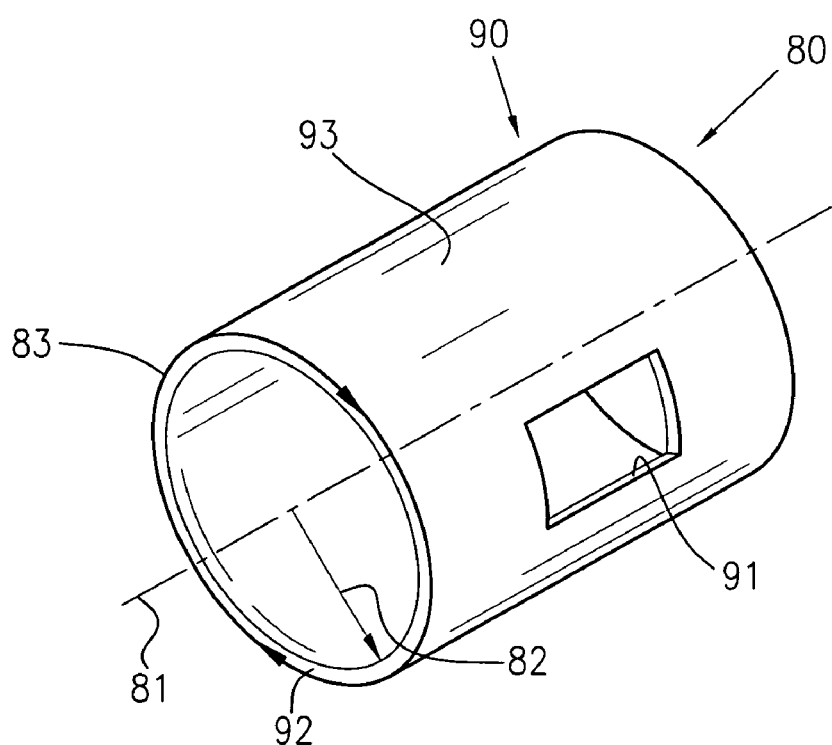
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

A present invention stator includes a one-way clutch and a blade assembly including two stamped blade segments. The clutch includes at least one slot opening radially outward from an outer circumferential portion of an outer race and at least one of the two stamped blade segments are rotationally connected to the one-way clutch via the slot as further described infra. By rotationally connected, or secured, we mean that the clutch and the blade segments are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra. The blade segments are fixedly secured one to the other at an outer circumference of the segments by any means known in the art.

Figure 2:
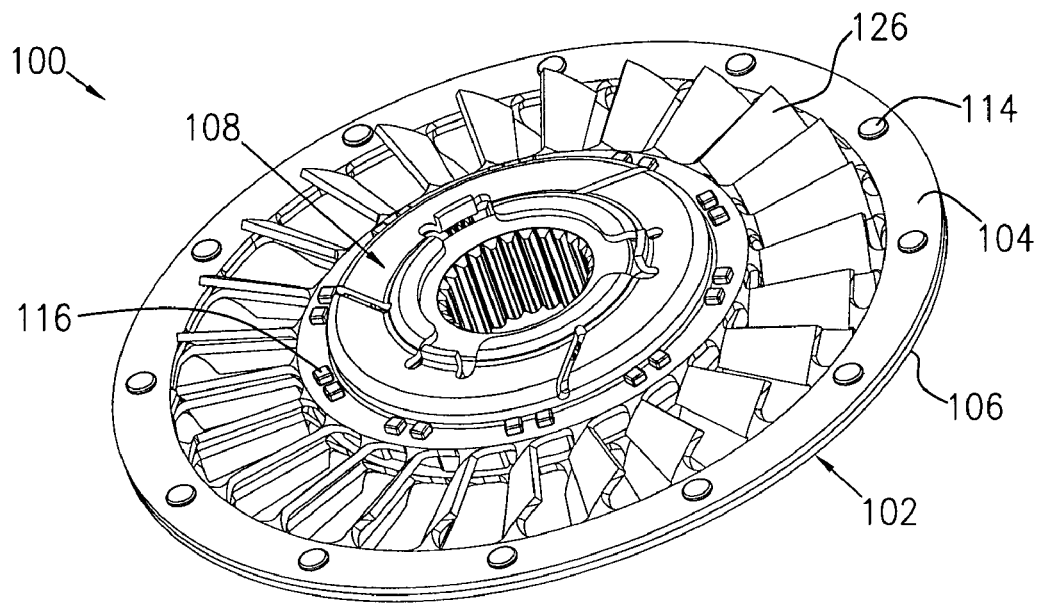
FIG. 2 is a front perspective view of a present invention stator with sheet metal rivets.

FIG. 2 is a front perspective view of present invention stator 100 with sheet metal rivets.

Figure 3:
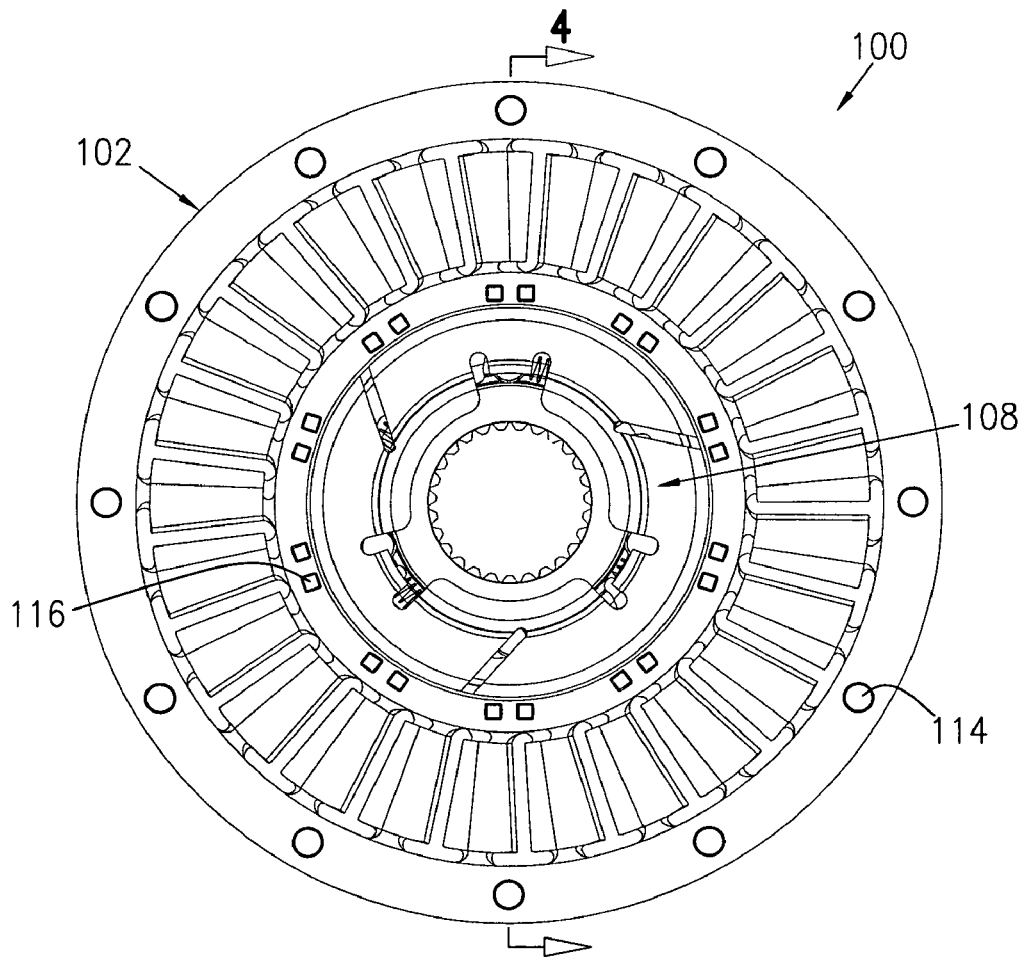
FIG. 3 is front view of the stator shown in FIG. 2.

FIG. 3 is a front view of stator 100 shown in FIG. 2.

Figure 4:
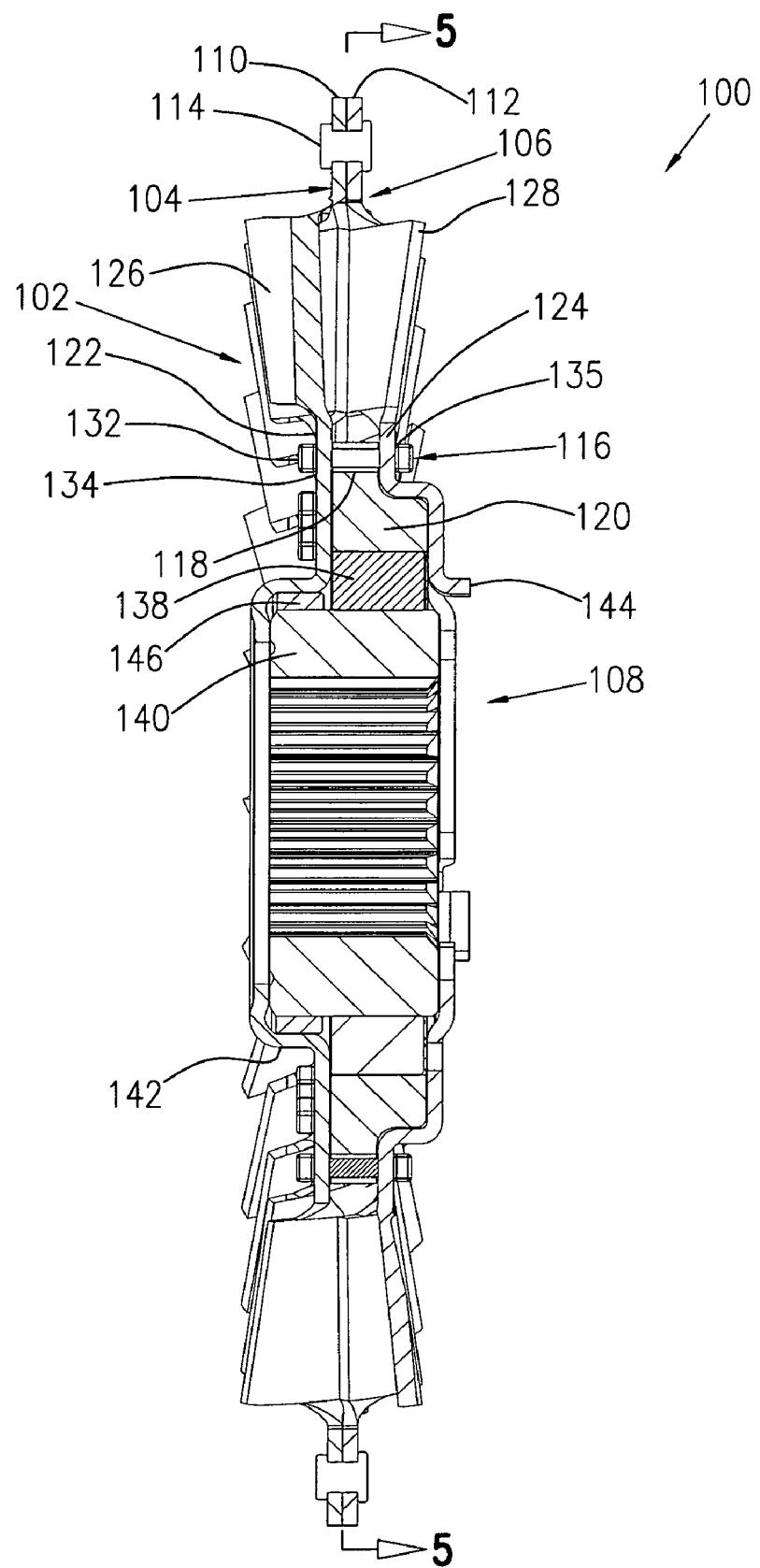
FIG. 4 is a cross-sectional view of the stator shown in FIG. 2, generally along line 4-4 in FIG. 3.

FIG. 4 is partial cross-sectional view of stator 100 shown in FIG. 2, generally along line 4-4 in FIG. 3.

Figure 5:
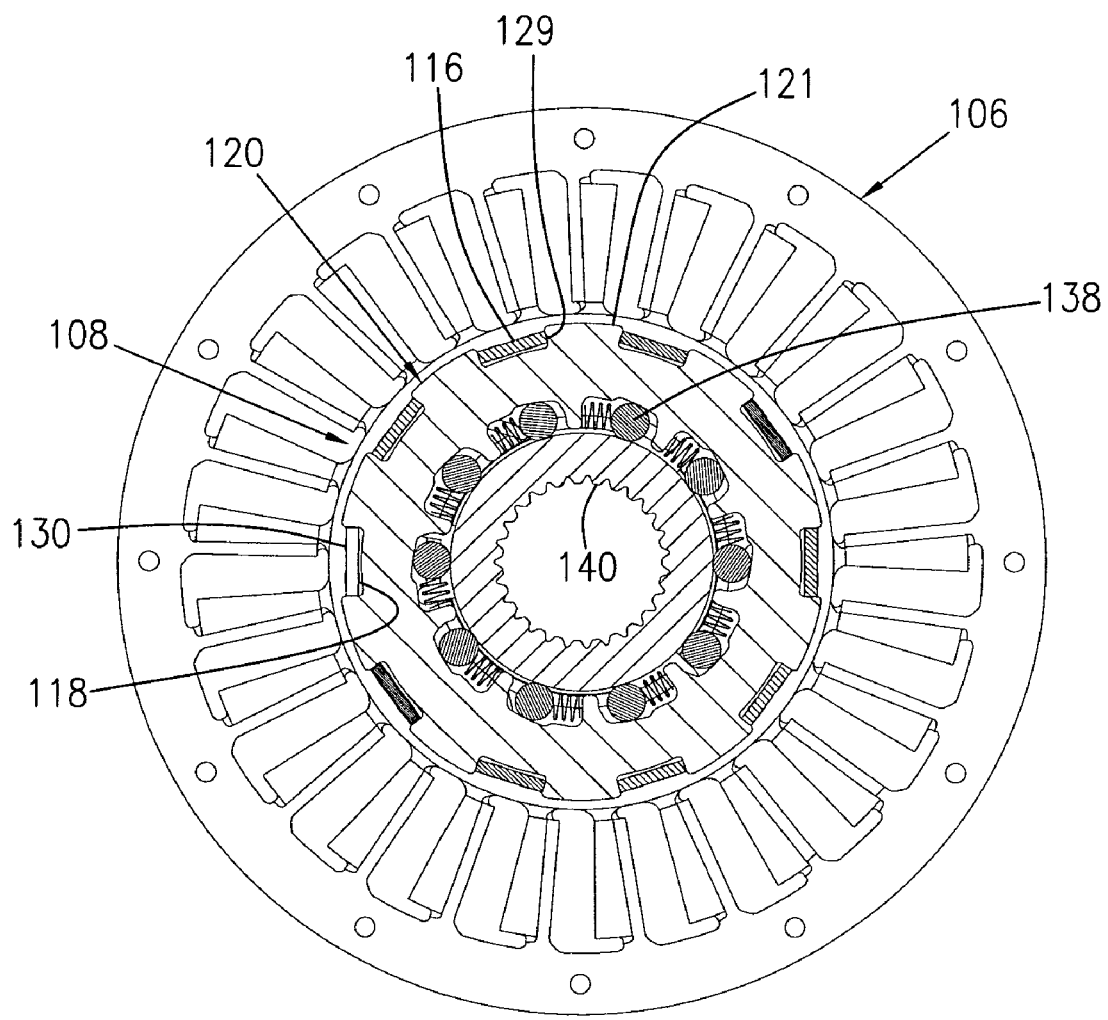
FIG. 5 is cross-sectional view of the stator shown in FIG. 2 generally along line 5-5 in FIG. 4.

FIG. 5 is cross-sectional view of stator 100 shown in FIG. 2 generally along line 5-5 in FIG. 4. The following should be viewed in light of FIGS. 2 through 5. In one embodiment, stator 100 includes blade assembly 102 with blade segments 104 and 106, and one way clutch 108. Outer circumferential portions 110 and 112 of segments 104 and 106, respectively, are fixedly connected by rivets 114; however, it should be understood that the portions can be joined by other means, including, but not limited to threaded fasteners, tabs, and welding. In one embodiment, at least portions of segments 104 and 106 are formed and configured as shown in commonly-owned U.S. patent application Ser. No. 11/728,066, filed Mar. 23, 2007.

In one embodiment, stator 100 includes at least one rivet 116 disposed in at least one radially opening slot 118 in outer race 120 of the clutch. By radially opening, we mean the opening for the slot is in a radial direction. Slots 118 are disposed in outer circumferential portion 121 of the race. Rivets 116 are fixedly secured to one or both of portions 122 and 124, respectively, of blade segments 104 and 106, respectively. Portions 122 and 124 are located radially inward from blades 126 and 128, respectively, for blade segments 104 and 106, respectively. Rivets 116 are rotationally connected to the clutch since the rivets are circumferentially interleaved with the outer race via the slots. That is, as the blade assembly rotates, the rivets engage respective radial walls for the slots, for example wall 129. In a free wheel mode, the clutch rotates with the blade assembly. In a locked mode, the clutch is rotationally fixed and contact between rivets 116 and the outer race also rotationally locks the blade assembly. Rivets 116 also axially fix portions 122 and 124.

Stator 100 is not limited to a particular size, shape, number, type, or configuration of rivets 116. In one embodiment, rivets 116 are sheet metal rivets having multiple heads. For example, rivets 116 include a circumferential portion 130 disposed in slots 118 and heads 132 disposed at openings 134 and 135 in portions 122 and 124, respectively. In one embodiment, the heads are peened or otherwise expanded to overlap radial surfaces surrounding the openings.

In one embodiment, the clutch includes rollers 138 and inner race 140. However, it should be understood that other one-way clutch configurations, including, but not limited to sprag one-way clutches also can be used in stator 100. In one embodiment, stator 100 is used in a torque converter (not shown) with one or two thrust bearings (not shown). Segments 104 and 106 include axially extending segments 142 and 144, respectively, with which the one or two thrust bearings in placed in contact to radially center the bearings. In one embodiment, segment 142 is a step formed in segment 104 and segment 144 is at least one axially extending tab. In one embodiment, the stator includes bushing 146 radially disposed between one or both of segments 104 and 106. In one embodiment, the bushing is between portion 142 and inner race 140. The bushing radially centers the stator.

Figure 6:
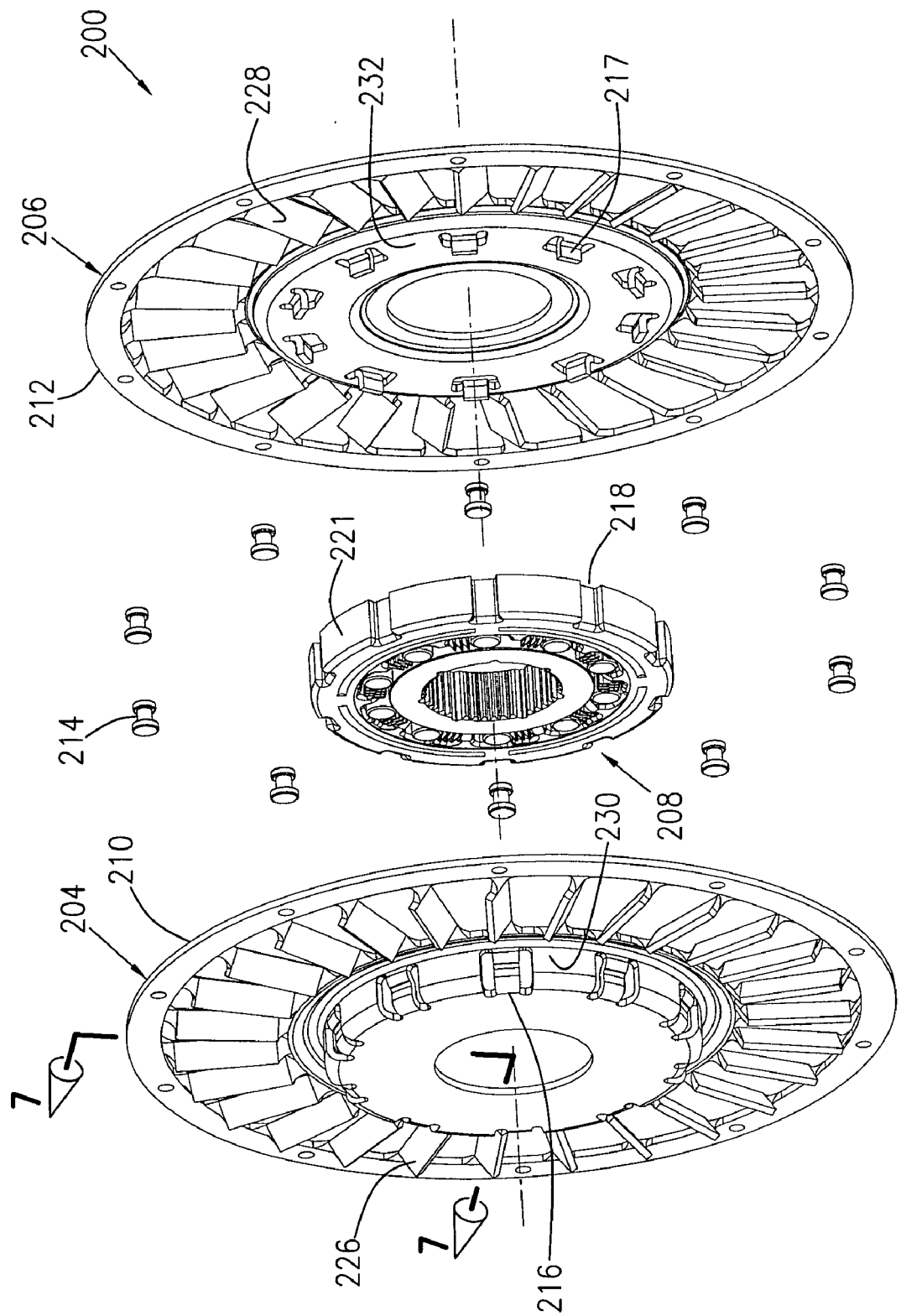
FIG. 6 is a front exploded view of a present invention stator with a spline connection; and, FIG. 7 is a partial cross-sectional view of the stator shown in FIG. 6, generally along line 7-7 in FIG. 6.

FIG. 6 is a front exploded view of present invention stator 200 with a spline connection.

Figure 7:
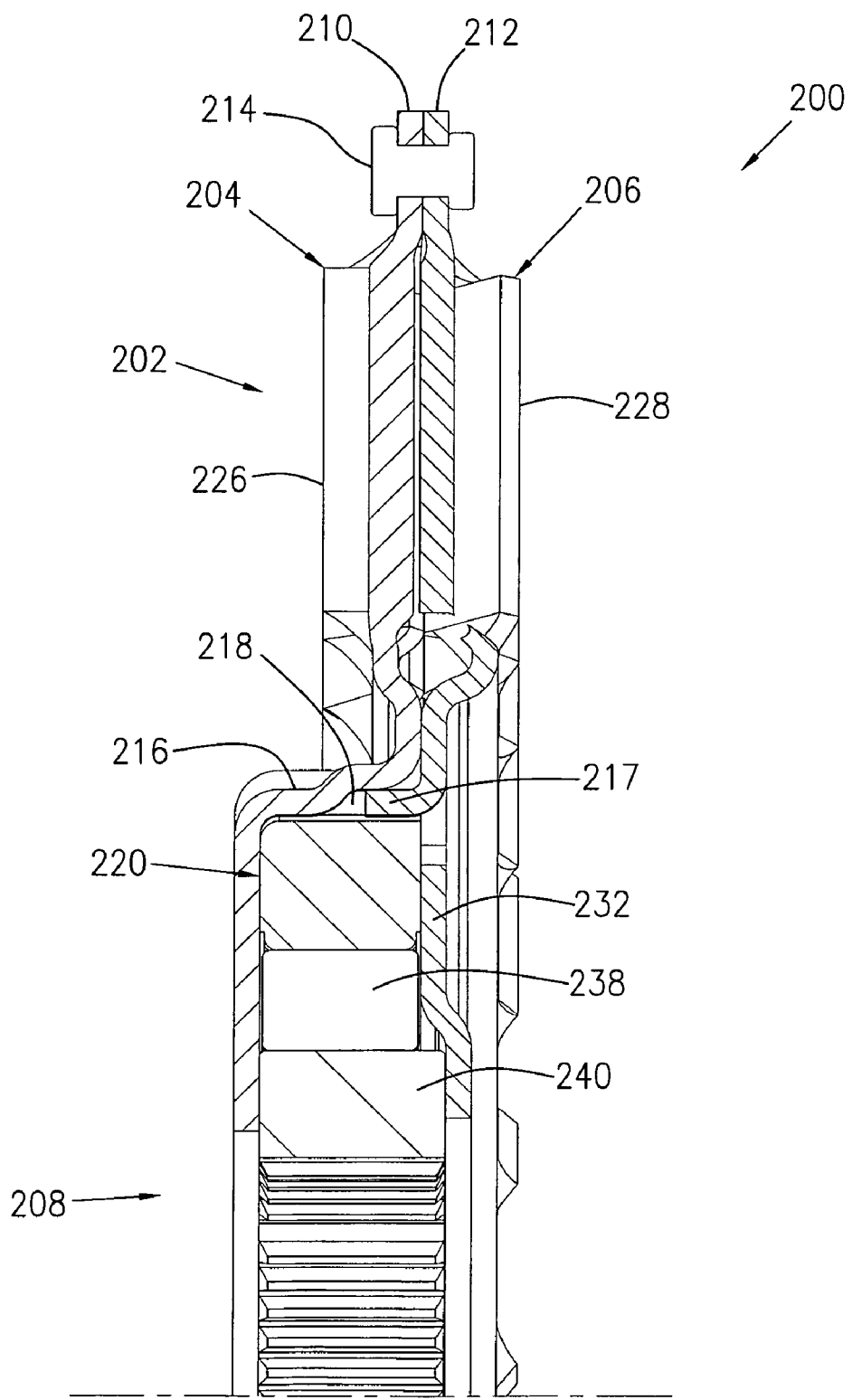

FIG. 7 is a partial cross-sectional view of stator 200 shown in FIG. 6, generally along line 7-7 in FIG. 6. The following should be viewed in light of FIGS. 6 and 7. In one embodiment, stator 200 includes blade assembly 202 with blade segments 204 and 206, and one way clutch 208. Outer circumferential portions 210 and 212 of segments 204 and 206, respectively, are fixedly connected by rivets 214; however, it should be understood that the portions can be joined by other means, including, but not limited to threaded fasteners, tabs, and welding. In one embodiment, at least portions of segments 204 and 206 are formed and configured as shown in commonly-owned U.S. patent application Ser. No. 11/728,066, filed Mar. 23, 2007.

Respective portions of one or both of segments 204 and 206 are disposed in slots 218. In one embodiment, segments 204 and 206 include portions 216 and 217, respectively, disposed in at least one radially opening slot 218 in outer race 220 of the clutch. By radially opening, we mean the opening for the slot is in a radial direction. Slots 218 are disposed in outer circumferential portion 221 of the race. Segments 216 and 217 are disposed radially inward from blades 226 and 228, respectively, for blade segments 204 and 206, respectively. It should be understood that stator 200 also can include only portions 216 or only portions 217. In one embodiment, portions 216 are protrusions stamped or pressed radially inward from substantially axially oriented segment 230. In one embodiment, portions 217 are axially extending tabs formed from substantially radially oriented portion 232. Advantageously, these embodiments of portions 216 and 217 can be formed by stamping processes. Portions 216 and 217 are rotationally connected to the clutch since the portions are circumferentially interleaved with the outer race via the slots. That is, as the blade assembly rotates, segments 216 and 217 engage respective radial walls for the slots. In a free wheel mode, the clutch rotates with the blade assembly. In a locked mode, the clutch is rotationally fixed and contact between segments 216 and 217 and the outer race also rotationally locks the blade assembly.

In one embodiment, the clutch includes rollers 238 and inner race 240. However, it should be understood that other one-way clutch configurations, including, but not limited to sprag one-way clutches also can be used in stator 200. In one embodiment, stator 200 is used in a torque converter (not shown) with one or two thrust bearings (not shown). In one embodiment (not shown) one or both of segments 204 and 206 include axially extending segments with which one or both of the thrust bearings are placed in contact to radially center the bearings. In one embodiment (not shown), the axial segment in segment 204 is a step formed in segment 204 and the axial segment in segment 206 is at least one axially extending tab. In one embodiment, the stator includes bushing (not shown) radially disposed between one or both of segments 204 and 206. In one embodiment (not shown), the stator includes a bushing radially disposed between the axial segment in segment 204 and inner race 240. The bushing radially centers the stator.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What we claim is:

1. A blade assembly for a stator, comprising:
    a first stamped blade segment arranged to be rotationally connected to an outer race of a one-way clutch using at least one radially opening slot on an outer race for the stator;
    a second stamped blade segment, separately formed from the first stamped blade segment, having an outer circumferential portion fixedly connected to an outer circumferential portion for the first stamped blade segment;
    a bearing; and
    wherein the first and second stamped segments include first and second axially extending segments, respectively, and wherein the bearing is radially centered by the first or second axially extending segments.

2. The blade assembly of claim 1 wherein the second stamped blade segment is arranged to be rotationally connected to the outer race using the at least one radially opening slot.

3. The blade assembly of claim 1 wherein the first and second stamped blade segments include at least one first and second portion, respectively, arranged to matingly engage with the at least one radially opening slot and disposed on respective portions of the first and second stamped blade segments disposed radially inward of respective blades in the first and second blade segments.

4. The blade assembly of claim 1 including at least one rivet arranged to be disposed in the at least one radially opening slot and fixedly secured to respective portions of the first and second stamped blade segments disposed radially inward of respective blades in the first and second blade segments.

5. The blade assembly of claim 4 wherein the first and second stamped blade segments include respective pluralities of openings and the at least one rivet includes a plurality of sheet metal rivets having respective portions disposed at respective openings in the respective pluralities of openings.

6. The blade assembly of claim 1 wherein the first and second stamped segments include first and second axially extending segments, respectively, arranged to center first and second thrust bearing, respectively.

7. The blade assembly of claim 6 wherein the first axially extending segment includes at least one axially extending tab.

8. The blade assembly of claim 1 wherein the first axially extending segment includes at least one axially extending tab.

9. The blade assembly of claim 1 including a bushing arranged to be radially disposed between an axially extending portion of the first or the second stamped blade segment and an inner race for the one-way clutch to radially center the stator.

10. The blade assembly of claim 1 including a bushing arranged to be radially disposed between respective axially extending portions of the first and the second stamped blade segments and an inner race for the one-way clutch to radially center the stator.

11. A stator comprising:
a one-way clutch with at least one slot opening radially outward from an outer circumferential portion of an outer race; and
a blade assembly including:
  a first stamped blade segment rotationally connected to the one-way clutch via the at least one slot;
  a second stamped blade segment, separately formed from the first stamped blade segment and having an outer circumferential portion fixedly connected to an outer circumferential portion for the first stamped blade assembly;
  first and second bearings; and
  wherein the first and second stamped segments include first and second axially extending segments, respectively, and wherein the first and second bearing are radially centered by the first and second axially extending segments.

12. The stator of claim 11 wherein the second stamped blade segment is rotationally connected to the one-way clutch via the at least one slot.

13. The stator of claim 11 wherein the first stamped blade segment includes a portion disposed in the at least one slot and disposed radially inward from blades for the first stamped blade segment and wherein the second stamped blade segment includes a portion disposed in the at least one slot and disposed radially inward from blades for the second stamped blade segment.

14. The stator of claim 11 including at least one rivet disposed in the at least one slot and fixedly secured to first and second portions of the first and second stamped blade segments, respectively, the first and second portions located radially inward from blades for the first and second stamped blade segments, respectively.

15. The stator of claim 14 wherein the first and second stamped blade segments include respective pluralities of openings and the at least one rivet includes a plurality of sheet metal rivets disposed at respective openings in the respective pluralities of openings.

16. The stator of claim 11 wherein the first axially extending segment includes at least one axially extending tab.

17. The stator of claim 11 including a bearing and wherein the first and second stamped segments include first and second axially extending segments, respectively, and wherein the bearing is radially centered by the first or second axially extending segments.

18. The stator of claim 17 wherein the first axially extending segment includes at least one axially extending tab.

19. The stator of claim 11 including a bushing radially disposed between an axially extending portion of the first or second stamped blade segment and an inner race for the one-way clutch to radially center the stator.

* * * * *